United States Patent
Kalnes

(10) Patent No.: US 9,222,037 B2
(45) Date of Patent: Dec. 29, 2015

(54) APPARATUSES AND METHODS FOR DEOXYGENATING BIOMASS-DERIVED PYROLYSIS OIL

(71) Applicant: UOP LLC, Des Plaines, IL (US)

(72) Inventor: Tom N. Kalnes, LaGrange, IL (US)

(73) Assignee: UOP LLC, Des Plaines, IL (US)

( * ) Notice: Subject to any disclaimer, the term of this patent is extended or adjusted under 35 U.S.C. 154(b) by 639 days.

(21) Appl. No.: 13/676,281

(22) Filed: Nov. 14, 2012

(65) Prior Publication Data

US 2014/0135544 A1    May 15, 2014

(51) Int. Cl.
*C07C 1/20* (2006.01)
*C10G 1/00* (2006.01)
*C10G 49/00* (2006.01)
*C10G 3/00* (2006.01)

(52) U.S. Cl.
CPC . *C10G 49/00* (2013.01); *C10G 3/00* (2013.01)

(58) Field of Classification Search
CPC .................................. C07C 1/20; C10G 1/00
USPC .................... 585/240, 242; 208/49
See application file for complete search history.

(56) References Cited

U.S. PATENT DOCUMENTS

| | | |
|---|---|---|
| 2009/0166256 A1 | 7/2009 | Lewis et al. |
| 2009/0321310 A1 | 12/2009 | Kokayeff et al. |
| 2009/0321319 A1 | 12/2009 | Kokayeff et al. |
| 2010/0133144 A1* | 6/2010 | Kokayeff et al. ...... C10G 45/58 208/57 |
| 2011/0083997 A1 | 4/2011 | Silva |
| 2012/0053377 A1 | 3/2012 | Mizan et al. |

OTHER PUBLICATIONS

International Search Report for PCT/US2013/059450, mailing date Jan. 23, 2014.

* cited by examiner

*Primary Examiner* — Thuan D Dang

(57) ABSTRACT

Apparatuses and methods for deoxygenating a biomass-derived pyrolysis oil are provided herein. In one example, the method comprises of dividing a feedstock stream into first and second feedstock portions. The feedstock stream comprises the biomass-derived pyrolysis oil and has a temperature of about 60° C. or less. The first feedstock portion is combined with a heated organic liquid stream to form a first heated diluted pyoil feed stream. The first heated diluted pyoil feed stream is contacted with a first deoxygenating catalyst in the presence of hydrogen to form an intermediate low-oxygen pyoil effluent. The second feedstock portion is combined with the intermediate low-oxygen pyoil effluent to form a second heated diluted pyoil feed stream. The second heated diluted pyoil feed stream is contacted with a second deoxygenating catalyst in the presence of hydrogen to form additional low-oxygen pyoil effluent.

17 Claims, 3 Drawing Sheets

APPARATUSES AND METHODS FOR DEOXYGENATING BIOMASS-DERIVED PYROLYSIS OIL

STATEMENT REGARDING FEDERALLY SPONSORED RESEARCH OR DEVELOPMENT

This invention was made with Government support under DE-EE0002879 awarded by the U.S. Department of Energy. The Government has certain rights in this invention.

TECHNICAL FIELD

The technical field relates generally to apparatuses and methods for producing biofuels, and more particularly to apparatuses and methods for producing low-oxygen biomass-derived pyrolysis oil from the catalytic deoxygenation of biomass-derived pyrolysis oil.

BACKGROUND

Fast pyrolysis is a process during which organic carbonaceous biomass feedstock, i.e., "biomass," such as wood waste, short rotation crops, agricultural waste, municipal solid waste, energy grasses, algae, etc., is rapidly heated to between about 300° C. to about 900° C. in the absence of air using a pyrolysis reactor. Under these conditions, solid products, liquid products, and gaseous pyrolysis products are produced. A condensable portion (vapors) of the gaseous pyrolysis products is condensed into biomass-derived pyrolysis oil (also referred to as "pyoil"). Biomass-derived pyrolysis oil can be burned directly as fuel for certain boiler and furnace applications, and can also serve as a potential feedstock in catalytic processes for the production of transportation fuels and transportation fuel blends in petroleum refineries. Recent estimates indicated that deoxygenated liquids produced from biomass-derived pyrolysis oil have the potential to replace more than 50% of transportation fuels, thereby reducing the dependency on conventional petroleum and reducing transportation sector environmental impacts such as greenhouse gas (GHG) emissions.

However, biomass-derived pyrolysis oil is a complex, highly oxygenated organic liquid having properties that currently limit its utilization as a biofuel. For example, biomass-derived pyrolysis oil has high acidity and a low energy density attributable in part to oxygenated hydrocarbons (and water) in the oil. "Oxygenated hydrocarbons" as used herein are organic compounds comprising hydrogen, carbon, and oxygen. Such oxygenated hydrocarbons in the biomass-derived pyrolysis oil include carboxylic acids, phenols, cresols, alcohols, aldehydes, etc. some of which are chemically unstable and can undergo secondary reactions during storage. Conventional biomass-derived pyrolysis oil comprises about 30% or greater by weight oxygen from these oxygenated hydrocarbons. Conversion of biomass-derived pyrolysis oil into high energy density, drop-in biofuels and chemicals requires hydrogen addition and full or partial deoxygenation of the biomass-derived pyrolysis oil.

Unfortunately, biomass-derived pyrolysis oil is a difficult feedstock to hydroprocess. First, catalytic hydrodeoxygenation of biomass-derived pyrolysis oil is very exothermic and can lead to undesirable hotspots anywhere from the catalyst surface to throughout the hydroprocessing reactor, making it difficult to control the reactor temperature profile both axially and radially. Poorly controlled catalytic deoxygenation of biomass-derived pyrolysis oil typically leads to fouling of the catalyst and rapid plugging of the hydroprocessing reactor. Without proper control of the reaction temperature, concentrations of the reactive species, and catalyst composition, refractory components can form on the catalyst surface and in the interstitial space between catalyst particles creating undesirable flow patterns, loss of catalyst activity, and a build-up in reactor differential pressure. It is believed that the formation of refractory components is due to thermal or acid catalyzed polymerization of at least a portion of the hydrogen-deficient and chemically unstable components present in the biomass-derived pyrolysis oil, e.g., second order reactions in which at least a portion of these reactive species chemically interact creating either a glassy brown polymer or powdery brown char that limits run duration and processibility of the biomass-derived pyrolysis oil.

Accordingly, it is desirable to provide apparatuses and methods for producing a low-oxygen biomass-derived pyrolysis oil with improved control over the reaction conditions. Moreover, it is desirable to provide apparatuses and methods for producing a low-oxygen biomass-derived pyrolysis oil with improved catalyst stability and increased on-stream efficiency and to improve the overall efficiency of converting biomass-derived pyrolysis oil to higher energy density liquid products suitable for use as transportation fuels and blendstocks. Furthermore, other desirable features and characteristics of the present invention will become apparent from the subsequent detailed description and the appended claims, taken in conjunction with the accompanying drawings and this background.

BRIEF SUMMARY

Apparatuses and methods for deoxygenating a biomass-derived pyrolysis oil are provided herein. In accordance with an exemplary embodiment, a method for deoxygenating a biomass-derived pyrolysis oil comprises the steps of dividing a feedstock stream into portions including a first feedstock portion and a second feedstock portion. The feedstock stream comprises the biomass-derived pyrolysis oil and has a first temperature of about 60° C. or less. The first feedstock portion is combined with a heated organic liquid stream to form a first heated diluted pyoil feed stream. The first heated diluted pyoil feed stream is contacted with a first deoxygenating catalyst in the presence of hydrogen and a first reaction zone at first hydroprocessing conditions effective to form a first intermediate low-oxygen pyoil effluent. The second feedstock portion is combined with the first intermediate low-oxygen pyoil effluent to form a second heated diluted pyoil feed stream. The second heated diluted pyoil feed stream is contacted with a second deoxygenating catalyst in the presence of hydrogen and a second reaction zone at second hydroprocessing conditions effective to form additional low-oxygen pyoil effluent. The first and second deoxygenating catalysts are the same type or different types of catalyst.

In accordance with another exemplary embodiment, a method for deoxygenating a biomass-derived pyrolysis oil is provided. The method comprises the steps of separating a low-oxygen pyoil effluent and optionally selectively heating to form a low-oxygen pyoil product stream, a heated recycle organic liquid stream, and a hydrogen-rich recycle gas stream. A feedstock stream comprising the biomass-derived pyrolysis oil and having a first temperature of about 60° C. or less is divided into portions including a first feedstock portion and a second feedstock portion. The first feedstock portion is combined with the heated recycle organic liquid stream and the hydrogen-rich recycle gas stream to form a first heated diluted pyoil feed stream. The first heated diluted pyoil feed stream is introduced to a first reaction zone that contains a first deoxygenating catalyst and that is operating at first hydroprocessing conditions effective to form a first intermediate low-oxygen pyoil effluent. The second feedstock portion is combined with the first intermediate low-oxygen pyoil effluent to form a second heated diluted pyoil feed stream. The second heated diluted high oil feed stream is introduced to a second reaction zone that contains a second deoxygenating catalyst and that is operating at second hydroprocessing conditions effective to form additional low-oxygen pyoil effluent. The first and second deoxygenating catalysts are the same type or different types of catalyst.

In accordance with another exemplary embodiment, an apparatus for deoxygenating a biomass-derived pyrolysis oil is provided. The apparatus configured to receive a feedstock stream. The feedstock stream comprises the biomass-derived pyrolysis oil and has a temperature of from about 60° C. or less. The apparatus is further configured to divide the feedstock stream into portions including a first feedstock portion and a second feedstock portion and to combine the first feedstock portion with a heated organic liquid stream to form a first heated diluted pyoil feed stream. A first reaction zone is configured to contain a first deoxygenating catalyst. The first reaction zone are further configured to receive the first heated diluted pyoil feed stream for contact with the first deoxygenating catalyst in the presence of hydrogen and to operate at first hydroprocessing conditions effective to form a first intermediate low-oxygen pyoil effluent. The apparatus is configured to combine the second feedstock portion with the first intermediate low-oxygen pyoil effluent to form a second heated diluted pyoil feed stream. A second reaction zone is configured to contain a second deoxygenating catalyst. The second reaction zone is further configured to receive the second heated diluted pyoil feed stream for contact with the second deoxygenating catalyst in the presence of hydrogen and to operate at second hydroprocessing conditions effective to form additional low-oxygen pyoil effluent. The first and second deoxygenating catalysts are the same type or different types of catalyst.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
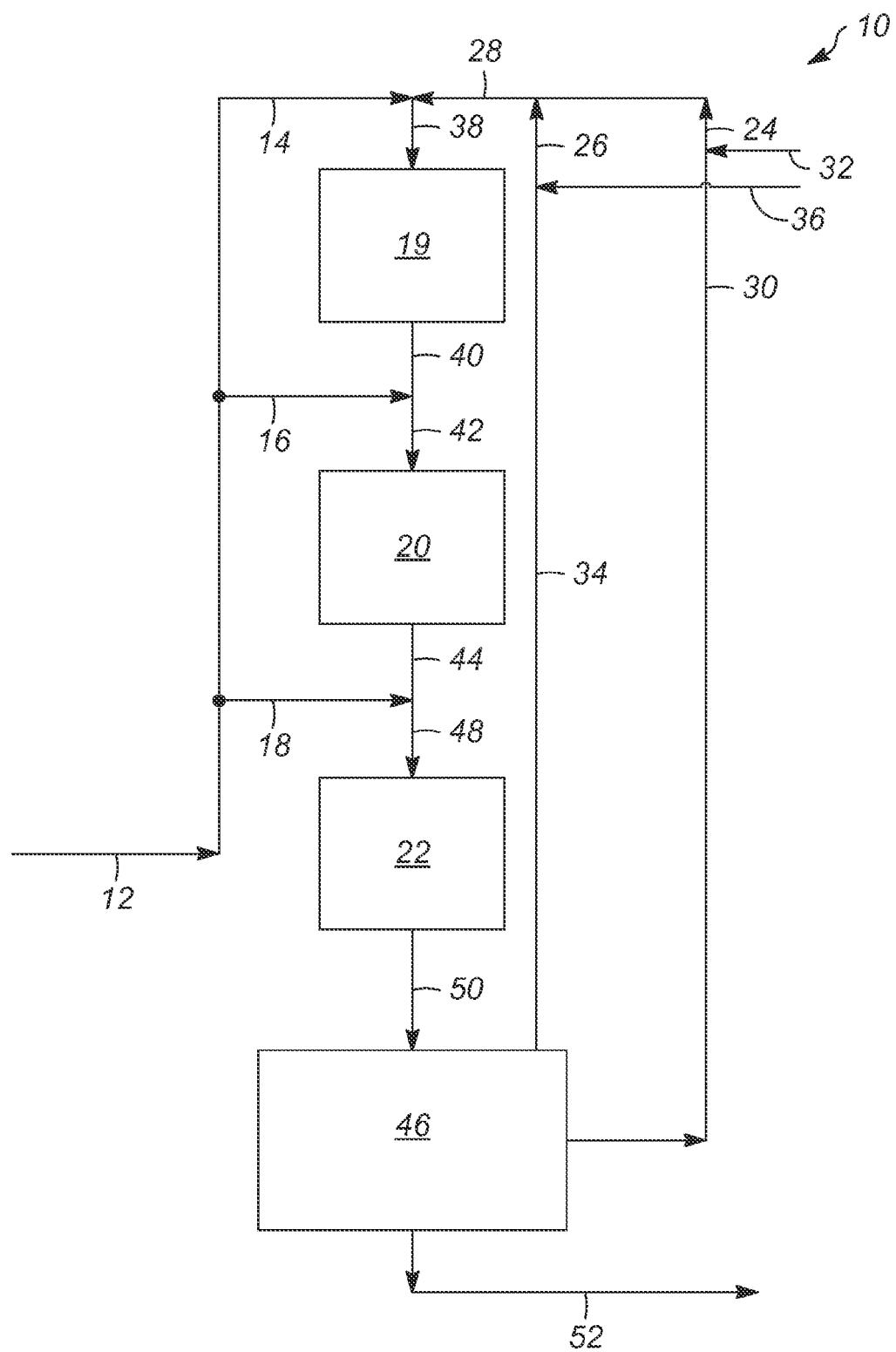
FIG. 1 is a block diagram of an apparatus and a method for deoxygenating a biomass-derived pyrolysis oil in accordance with an exemplary embodiment.

The following detailed description is merely exemplary in nature and is not intended to limit the various embodiments or the application and uses thereof. Furthermore, there is no intention to be bound by any theory presented in the preceding background or the following detailed description.

Various embodiments contemplated herein relate to methods for deoxygenating a biomass-derived pyrolysis oil (also referred to herein as "pyoil"). Unlike the prior art, the exemplary embodiments taught herein employ a series of reaction zones including a first reaction zone and a second reaction zone that are in fluid communication with each other. As used herein, the term "zone" refers to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones. A feedstock stream comprising the biomass-derived pyrolysis oil and having a temperature of from about 60° C. or less is divided into portions including a first feedstock portion and a second feedstock portion. The first feedstock portion is combined with a heated organic liquid stream and a hydrogen-rich gas stream to dilute and quickly heat the first feedstock portion and form a first heated diluted pyoil feed stream. In an exemplary embodiment, the heated organic liquid stream and/or the hydrogen-rich gas stream are recycle streams separated from an effluent downstream from the second reaction zone. The first heated diluted pyoil feed stream is introduced to the first reaction zone and contacts a deoxygenating catalyst that is contained in the first reaction zone. The first reaction zone is operating at hydroprocessing conditions effective to form an intermediate low-oxygen pyoil effluent. The terms "low-oxygen pyoil," "low-oxygen pyrolysis oil," and "low-oxygen biomass-derived pyrolysis oil" generally include any oil produced having a lower oxygen concentration than conventional biomass-derived pyrolysis oil. This includes oil having no oxygen, i.e., a biomass-derived pyrolysis oil in which all the oxygenated hydrocarbons have been converted into hydrocarbons or oil comprising oxygen in an amount of from about 0 to about 10 weight percent (wt. %). "Hydrocarbons" as used herein are organic compounds that contain principally only hydrogen and carbon, i.e., oxygen-free. "Oxygenated hydrocarbons" as discussed above are organic compounds containing hydrogen, carbon, and oxygen.

In an exemplary embodiment, due to the exothermic catalytic deoxygenation of oxygenated hydrocarbons in feedstock stream, the first intermediate low-oxygen pyoil effluent is formed having a higher temperature than the first heated diluted pyoil feed stream. To help control the reaction conditions for subsequent hydroprocessing, the second feedstock portion is combined with the first intermediate low-oxygen pyoil effluent, which effectively dilutes and heats the second feedstock portion and partially cools (e.g., quenches) the first intermediate low-oxygen pyoil effluent, to form a second heated diluted pyoil feed stream. The second heated diluted pyoil feed stream, which is at an elevated temperature effective for hydroprocessing, is introduced to a second reaction zone and contacts a deoxygenating catalyst that is contained in the second reaction zone to form additional low-oxygen pyoil effluent.

It has been found that by partially cooling the low-oxygen pyoil effluent between reaction zones (e.g., between the first and second reaction zones), reaction conditions such as temperature and pressure can be more effectively controlled throughout the process for deoxygenating the biomass-derived pyrolysis oil. Moreover, it has also been found that by contacting the deoxygenating catalyst(s) with the diluted biomass-derived pyrolysis oil (e.g., first and second heated diluted pyoil feed streams) including hydrogen at the hydroprocessing conditions, the amount of glassy brown polymer or powdery brown char formed on the deoxygenating catalyst is substantially reduced or minimized relative to conventional methods. Without being limited by theory, it is believed that by diluting portions of the biomass-derived pyrolysis oil in the feedstock stream with the heated organic liquid stream or the intermediate low-oxygen pyoil effluent, simple reactions of the biomass-derived pyrolysis oil with hydrogen to form a lower-oxygen biomass-derived pyrolysis oil are effectively increased and dominate while secondary polymerization reactions of biomass-derived pyrolysis oil components with themselves are reduced or minimized, thereby reducing or minimizing the formation of glassy brown polymers or powdery brown char on the deoxygenating catalyst. Therefore, a low-oxygen biomass-derived pyrolysis oil can be produced without plugging the deoxygenating catalyst/reaction zones, thereby increasing run duration and improving processibility of the biomass-derived pyrolysis oil.

Referring to FIG. 1, a schematic depiction of an apparatus 10 for deoxygenating a biomass-derived pyrolysis oil in accordance with an exemplary embodiment is provided. As illustrated, a feedstock stream 12 that comprises the biomass-derived pyrolysis oil is introduced to the apparatus 10. The biomass-derived pyrolysis oil may be produced, such as, for example, from pyrolysis of biomass in a pyrolysis reactor. Virtually any form of biomass can be used for pyrolysis to produce a biomass-derived pyrolysis oil. The biomass-derived pyrolysis oil may be derived from biomass material, such as, wood, agricultural waste, nuts and seeds, algae, forestry residues, and the like. The biomass-derived pyrolysis oil may be obtained by different modes of pyrolysis, such as, for example, fast pyrolysis, vacuum pyrolysis, catalytic pyrolysis, and slow pyrolysis or carbonization, and the like. The composition of the biomass-derived pyrolysis oil can vary considerably and depends on the feedstock and processing variables. Examples of biomass-derived pyrolysis oil "as-produced" can contain up to about 30 wt. % or greater oxygen, about 1,000 to about 2,000 ppm total metals, about 20 to about 33 wt. % of water that can have high acidity (e.g. total acid number (TAN)>150), and a solids content of about 0.1 wt. % to about 5 wt. %. The biomass-derived pyrolysis oil may be untreated (e.g. "as produced"). However, if needed the biomass-derived pyrolysis oil can be selectively treated to reduce any or all of the above to a desired level.

In an exemplary embodiment, the biomass-derived pyrolysis oil is thermally unstable and is at a temperature of about 60° C. or less, such as about 50° C. or less, such as from about 15 to about 50° C., for example from about 15 to about 40° C., to minimize secondary polymerization reactions of the various components in the biomass-derived pyrolysis oil with themselves. As illustrated, the feedstock stream 12 is divided into a plurality of feedstock portions 14, 16, and 18 parallel to or alongside a series of reaction zones 19, 20, and 22. In an exemplary embodiment, the feedstock portion 14 has a pyoil mass flow rate of from about 10% to about 35% of the feedstock stream 12, the feedstock portion 16 has a pyoil mass flow rate of from about 15% to about 35% of the feedstock stream 12, and the feedstock portion 18 has a pyoil mass flow rate of from about 15% to about 50% of the feedstock stream 12. Although the apparatus 10 is shown as having three reaction zones, it is to be understood that the apparatus 10 can alternatively comprise two reaction zones or more than three reaction zones. In an exemplary embodiment, the feedstock stream 12 is divided into a number of portions that correspond to the number of reaction zones.

In an exemplary embodiment, a heated organic liquid stream 24 is combined with a hydrogen-rich gas stream 26 to form a heated combined stream 28. As will be discussed in further detail below, in an exemplary embodiment, a heated recycle organic liquid stream 30 forms the heated organic liquid stream 24 during a continuous operation phase of the apparatus 10 while a heated co-feed organic liquid stream 32 (e.g., alcohols, ethers, and phenolic compounds, e.g., cresols, ethanol, isobutanol, and the like) may be used to initially form the heated organic liquid stream 24 during a startup phase of the apparatus 10. The hydrogen-rich gas stream 26 comprises a hydrogen-rich recycle gas stream 34, a fresh/make-up hydrogen-rich gas stream 36, or a combination thereof.

In an exemplary embodiment, the heated organic liquid stream 24 comprises various low-oxygen biomass-derived pyrolysis oil components from the heated recycle organic liquid stream 30 such as hydrocarbons and/or oxygenated hydrocarbons (e.g., alcohols, ethers, phenolic compounds, and the like) that are mutually miscible with the biomass-derived pyrolysis oil and/or the products produced in the reaction zones 19, 20, and 22. In one embodiment, the heated organic liquid stream 24 comprises oxygen in an amount of from about 0 to about 10 wt. % of the heated organic liquid stream 24. Non-limiting examples of various components contained in the heated organic liquid stream 24 include $C_4^+$ hydrocarbons, various phenolic compounds such as phenols, cresols, and the like, alcohols such as ethanol, isobutanol, and the like, carboxylic acids, aldehydes, and the like. As used herein, $C_x$ means hydrocarbon molecules that have "X" number of carbon atoms, $C_x+$ means hydrocarbon molecules that have "X" and/or more than "X" number of carbon atoms, and $C_x-$ means hydrocarbon molecules that have "X" and/or less than "X" number of carbon atoms. In an exemplary embodiment, the heated organic liquid stream 24 and correspondingly the heated combined stream 28 are at a temperature of from about 150 to about 400° C., such as about 290 to about 350° C.

Upstream from the reaction zone 19, the feedstock portion 14 and the heated combined stream 28 are combined to form a heated diluted pyoil feed stream 38. In an exemplary embodiment, the feedstock portion 14 and the heated combined stream 28 are combined at a predetermined pyoil to recycle oil ratio of from about 1:5 to about 1:40, such as about 1:10 to about 1:20. The predetermined pyoil to recycle oil ratio is defined as a pyoil mass flow rate of the feedstock portion 18 to a recycle oil mass flow rate of the heated recycle organic liquid stream 30. In an exemplary embodiment, the heated diluted pyoil feed stream 38 has a temperature of from about 100 to about 300° C.

As illustrated, the heated diluted pyoil feed stream 38 is introduced to the reaction zone 19. The reaction zone 19, and independently the reaction zones 20 and 22, may be a reactor such as a batch reactor or a continuous flow reactor, for example a fixed-bed reactor, a continuous stirred tank reactor (CSTR), a trickle bed reactor, an ebulliating bed reactor, a slurry reactor, or any other reactor known to those skilled in the art for hydroprocessing. Alternatively, the reaction zone 19, and independently the reaction zones 20 and 22, may be a subzone or individual bed in a reactor in which two or more of the reaction zones 19, 20, and 22 are arranged in a common reactor vessel.

The reaction zone 19 contains a deoxygenating catalyst. In an exemplary embodiment, the deoxygenating catalyst comprises a metal or a combination of metals, such as a base metal(s), a refractory metal(s), and/or a noble metal(s), such as platinum, palladium, ruthenium, nickel, molybdenum, tungsten, and/or cobalt. The metal(s) may be on a support, such as a carbon support, a silica support, an alumina support, a silica-alumina support, a gamma alumina support, and/or a titanium support. The deoxygenating catalyst may be a more active catalyst or a less active catalyst for deoxygenation. A more active catalyst for deoxygenation is a catalyst with either higher loadings of active metals, higher loaded density, or more active metals, such as, for example, nickel molybdenum, which is more active for deoxygenation than cobalt molybdenum, palladium, which is more active than nickel molybdenum, and reduced palladium, which is more active than palladium sulfide. Other hydroprocessing catalyst known to those skilled in the art may also be used.

The reaction zone 19 is operating at hydroprocessing conditions. In an exemplary embodiment, the hydroprocessing conditions include a reactor temperature of from about 100 to about 350 C, such as from about 200 to about 300 C, a reactor pressure of from about 3,500 to about 15,000 kPa gauge, a liquid hourly space velocity (LHSV) on a basis of volume of the biomass-derived pyrolysis oil/volume of catalyst/hour ($hr^{-1}$) of from about 0.1 to about 1 $hr^{-1}$, and a hydrogen-containing gas treat rate of from about 175 to about 2,700 standard liters of hydrogen per liter of pyrolysis oil feed (SL $H_2$/L feed). In one embodiment, if a more active catalyst or a higher quantity of catalyst is used for the deoxygenating catalyst, for example, than in the other reaction zones 20 and/or 22, lower reaction temperatures may be used for the hydroprocessing conditions, such as from about 150 to about 250° C., while if a less active catalyst or a lower quantity of catalyst is used for the deoxygenating catalyst, for example, than in the other reaction zones 20 and/or 22, higher reaction temperatures may be used for the hydroprocessing conditions, such as from about 200 to about 350° C.

The heated diluted pyoil feed stream 38 contacts the deoxygenating catalyst to form an intermediate low-oxygen pyoil effluent 40 by converting at least a portion of the oxygenated hydrocarbons in the biomass-derived pyrolysis oil into hydrocarbons. In particular, hydrogen from the hydrogen-rich gas stream 26 removes oxygen from the biomass-derived pyrolysis oil as water to produce the intermediate low-oxygen pyoil effluent 40. The oil contained in the intermediate low-oxygen pyoil effluent 40 may be partially deoxygenated with some residual oxygenated hydrocarbons, or may be substantially fully deoxygenated where substantially all of the oxygenated hydrocarbons are converted into hydrocarbons. It is believed that the benefits of catalytically deoxygenating the biomass-derived pyrolysis oil diluted with the heated organic liquid stream 24, include, but are not limited to, increasing hydrogen solubility, immolation of the exotherm by dilution of the reactive species in the biomass-derived pyrolysis oil, and reducing the reaction rate of bimolecular reactants that lead to secondary polymerization reactions. As such, simple reactions of the biomass-derived pyrolysis oil with hydrogen to form a lower-oxygen biomass-derived pyrolysis oil dominate while secondary polymerization reactions of biomass-derived pyrolysis oil components with themselves are reduced or minimized, thereby reducing or minimizing the formation of glassy brown polymers or powdery brown char on the deoxygenating catalyst.

In an exemplary embodiment, due to the exothermic catalytic deoxygenation reaction, the intermediate low-oxygen pyoil effluent 40 is formed having a temperature of from about 160 to about 360° C., such as from about 260 to about 350° C. The intermediate low-oxygen pyoil effluent 40 is removed from the reaction zone 19 and is combined with the feedstock portion 16, which effectively dilutes and heats the feedstock portion 16 and partially cools the intermediate low-oxygen pyoil effluent 40, to form a heated diluted pyoil feed stream 42. It has been found that cooling the combined pyoil reactants and product effluent at an intermediate stage in hydroprocessing helps control the reaction conditions by reducing or limiting the temperature rise from the exothermic catalytic deoxygenation reaction. In an exemplary embodiment, the heated diluted pyoil feed stream 42 has a temperature of from about 120 to about 350° C.

As illustrated, the heated diluted pyoil feed stream 42 is introduced to the reaction zone 20. The reaction zone 20 contains a deoxygenating catalyst and is operating at hydroprocessing conditions. The deoxygenating catalyst in reaction zone 20 can be the same as in reaction zone 19 or can be a different deoxygenating catalyst. In an exemplary embodiment, the hydroprocessing conditions include a reactor temperature of from about 100 to about 350 C, such as from about 200 to about 300 C, and a reactor pressure of from about 3,500 to about 15,000 kPa gauge. In one embodiment, if a more active catalyst or a higher quantity of catalyst is used for the deoxygenating catalyst, for example, than in the other reaction zones 19 and/or 22, lower reaction temperatures may be used for the hydroprocessing conditions, such as from about 150 to about 250° C., while if a less active catalyst or a lower quantity of catalyst is used for the deoxygenating catalyst, for example, than in the other reaction zones 19 and/or 22, higher reaction temperatures may be used for the hydroprocessing conditions, such as from about 200 to about 350° C.

The heated diluted pyoil feed stream 42, which contains unreacted hydrogen from the intermediate low-oxygen pyoil effluent 40, contacts the deoxygenating catalyst to form an intermediate low-oxygen pyoil effluent 44 by converting at least a portion of the oxygenated hydrocarbons in the biomass-derived pyrolysis oil into hydrocarbons as discussed above. In an exemplary embodiment, due to the exothermic catalytic deoxygenation reaction, the intermediate low-oxygen pyoil effluent 44 is formed having a temperature of from about 160 to about 360° C., such as from about 260 to about 350° C.

The intermediate low-oxygen pyoil effluent 44 is removed from the reaction zone 20. In an exemplary embodiment, if the apparatus 10 comprises only two reaction zones 19 and 20, then the intermediate low-oxygen pyoil effluent 44 is advanced directly to the product separation zone 46. Alternatively and as illustrated, if the apparatus 10 contains at least the three reaction zones 19, 20, and 22, then the intermediate low-oxygen pyoil effluent 44 is combined with the feedstock portion 18, which effectively dilutes and heats the feedstock portion 18 and partially cools the intermediate low-oxygen pyoil effluent 44, to form a heated diluted pyoil feed stream 48. As discussed above, cooling the combined pyoil reactants and product effluent at an intermediate stage in hydroprocessing helps control the reaction conditions. In an exemplary embodiment, the heated diluted pyoil feed stream 48 has a temperature of from about 100 to about 300° C.

The heated diluted pyoil feed stream 48 is introduced to the reaction zone 22. The reaction zone 22 contains a deoxygenating catalyst and is operating at hydroprocessing conditions. The deoxygenating catalyst in reaction zone 22 can be the same as in reaction zones 19 and/or 20 or can be a different deoxygenating catalyst. In an exemplary embodiment, the hydroprocessing conditions include a reactor temperature of from about 100 to about 350 C, such as from about 200 to about 300 C, and a reactor pressure of from about 3,500 to about 15,000 kPa gauge. In one embodiment, if a more active catalyst or a higher quantity of catalyst is used for the deoxygenating catalyst, for example, than in the other reaction zones 19 and/or 20, lower reaction temperatures may be used for the hydroprocessing conditions, such as from about 150 to about 250° C., while if a less active catalyst or a lower quantity of catalyst is used for the deoxygenating catalyst, for example, than in the other reaction zones 19 and/or 20, higher reaction temperatures may be used for the hydroprocessing conditions, such as from about 200 to about 350° C.

The heated diluted pyoil feed stream 48, which contains unreacted hydrogen from the intermediate low-oxygen pyoil effluent 44, contacts the deoxygenating catalyst to form a low-oxygen pyoil effluent 50 by converting at least a portion of the oxygenated hydrocarbons in the biomass-derived pyrolysis oil into hydrocarbons as discussed above. In an exemplary embodiment, due to the exothermic catalytic deoxygenation reaction, the low-oxygen pyoil effluent 50 is formed having a temperature of from about 160 to about 360° C., such as from about 260 to about 350° C.

The low-oxygen pyoil effluent 50 is removed from the reaction zone 20. As illustrated, the low-oxygen pyoil effluent 50 is introduced to the product separation zone 46. The product separation zone 46 removes light volatiles (e.g., hydrogen, $C_3^-$ hydrocarbons, and the like), water, and the like from the low-oxygen pyoil effluent 50 by cooling, heating, and/or fractionating as is well known in the art using one or more separation vessels, fractionation columns, heaters, condensers exchangers, pipes, pumps, compressors, controllers, and/or the like. In an exemplary embodiment, the product separation zone 46 separates the low-oxygen pyoil effluent 50 into the heated recycle organic liquid stream 30, the hydrogen-rich recycle gas stream 34, and a low-oxygen pyoil product stream 52.

Figure 2:
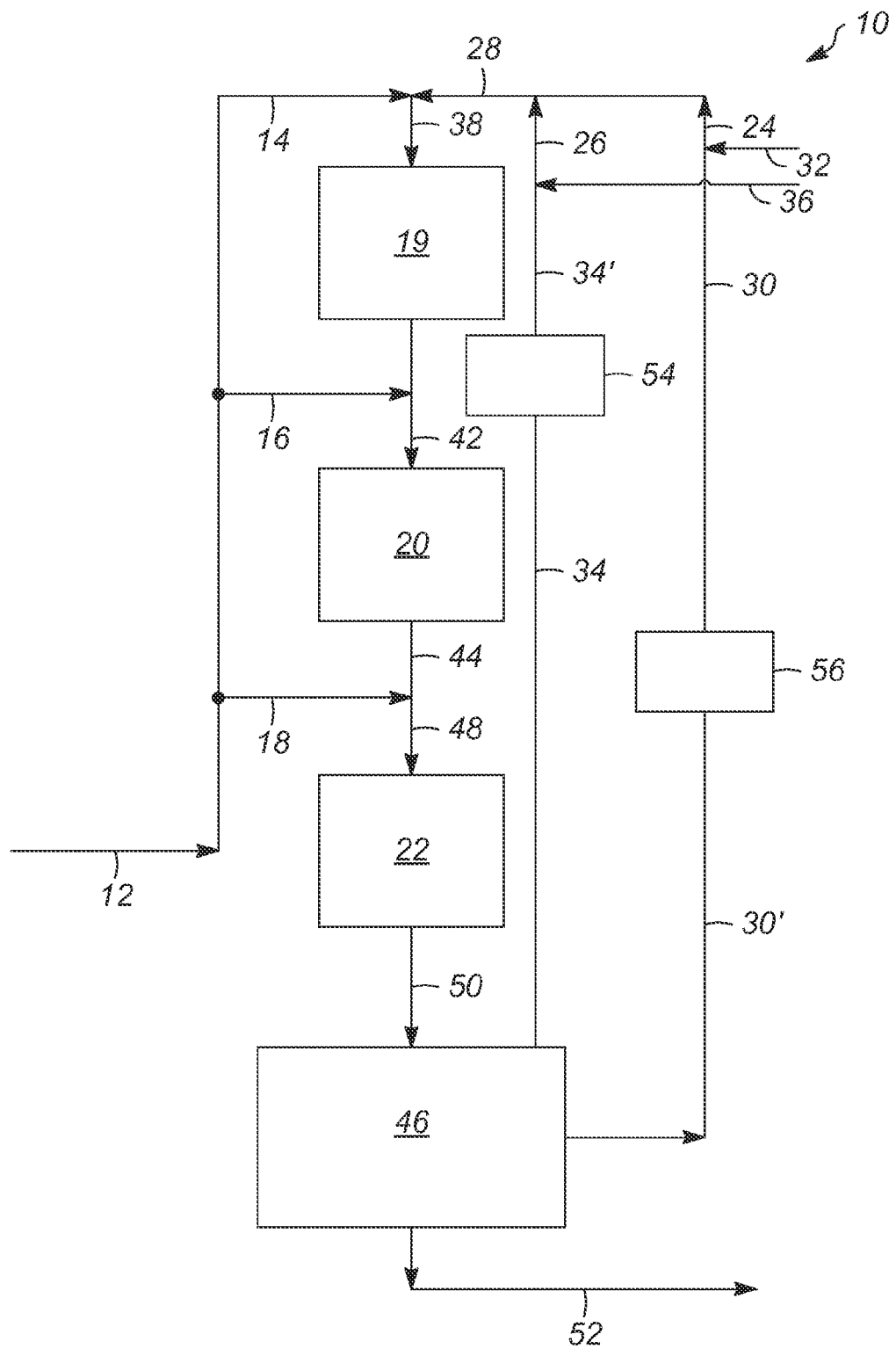
FIG. 2 is a block diagram of an apparatus and a method for deoxygenating a biomass-derived pyrolysis oil in accordance with another exemplary embodiment.
Figure 3:
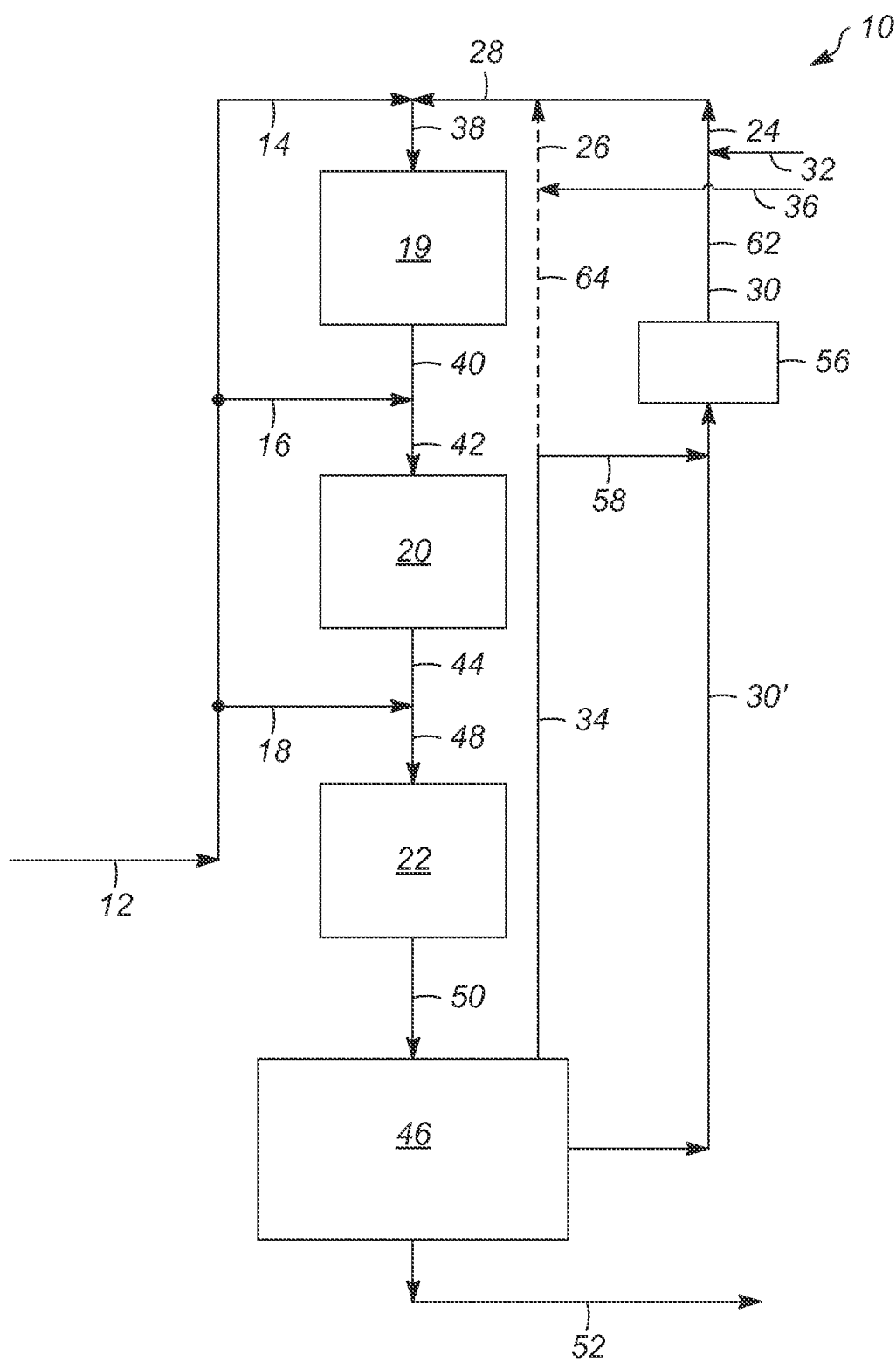
FIG. 3 is a block diagram of an apparatus and a method for deoxygenating a biomass-derived pyrolysis oil in accordance with another exemplary embodiment.

FIGS. 2 and 3, illustrate modified embodiments for the apparatus 10 that are similar to the apparatus 10 shown in FIG. 1 with the exception of the flow streams between the product separation zone 46 and the reaction zone 19. In particular and as illustrated in FIG. 2, heaters 54 and/or 56 may optionally be arranged downstream from the product separation zone 46. Depending upon the temperatures used to separate the low-oxygen pyoil effluent 50 in the product separation zone 46, it may be desirable to add heat to the recycle streams. In one embodiment, the product separation zone 46 separates the low-oxygen pyoil effluent 50 into a recycle organic liquid stream 30', the hydrogen-rich recycle gas stream 34, and the low-oxygen pyoil product stream 52. As illustrated, the hydrogen-rich recycle gas stream 34 is passed along from the product separation zone 46 and is introduced to the heater 54 to produce a heated hydrogen-rich recycle gas stream 34'. In one example, the heated hydrogen-rich recycle gas stream 34' has a temperature of from about 100 to about 300° C. In another embodiment, the recycle organic liquid stream 30' is passed along from the product separation zone 46 and is introduced to the heater 56 to form the heated recycle organic liquid stream 30 as discussed above. Downstream from the heaters 54 and 56, the heated hydrogen-rich recycle gas stream 34' and the heated recycle organic stream 30 are combined to form the heated combined streams 28.

As illustrated in FIG. 3, in an alternative embodiment, at least a portion 58 of the hydrogen-rich recycle gas stream 34 is combined with the recycle organic liquid stream 30' downstream from the product separation zone 46 and upstream from the heater 56 to form a combined stream 60. The combined streams 60 is passed through the heater 56 to form a heated recycle hydrogen-containing organic liquid stream 62, which contains the heated recycle organic liquid stream 30 as discussed above. In an exemplary embodiment, the heated recycle hydrogen-containing organic liquid stream 62 has a temperature of from about 100 to about 300° C. The heated recycle hydrogen-containing organic liquid stream 62 is then passed along and combined with any remaining portion 64 of the hydrogen-rich recycle gas stream 34 to form the heated combined streams 28 as discussed above.

Accordingly, apparatuses and methods for deoxygenating a biomass-derived pyrolysis oil have been described. Unlike the prior art, the exemplary embodiments taught herein employ a series of reaction zones including a first reaction zone and a second reaction zone that are in fluid communication with each other. A feedstock stream comprising the biomass-derived pyrolysis oil and having a temperature of from about 60° C. or less is divided into portions including a first feedstock portion and a second feedstock portion. The first feedstock portion is combined with a heated organic liquid stream and a hydrogen-rich gas stream to form a first heated diluted pyoil feed stream. The first heated diluted pyoil feed stream is introduced to the first reaction zone and contacts a deoxygenating catalyst. The first reaction zone is operating at hydroprocessing conditions effective to form an intermediate low-oxygen pyoil effluent. To help control the reaction conditions for subsequent hydroprocessing, the second feedstock portion is combined with the first intermediate low-oxygen pyoil effluent, which effectively dilutes and heats the second feedstock portion and partially cools the first intermediate low-oxygen pyoil effluent, to form a second heated diluted pyoil feed stream. The second heated diluted pyoil feed stream is introduced to a second reaction zone and contacts a deoxygenating catalyst to form additional low-oxygen pyoil effluent.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A method for deoxygenating a biomass-derived pyrolysis oil, the method comprising the steps of:

dividing a feedstock stream comprising the biomass-derived pyrolysis oil and having a first temperature of about 60° C. or less into portions including a first feedstock portion and a second feedstock portion;

combining the first feedstock portion with a heated co-feed organic liquid stream comprising alcohols, ethers, phenolic compounds, or mixtures thereof to form a first heated diluted pyoil feed stream;

contacting the first heated diluted pyoil feed stream with a first deoxygenating catalyst in the presence of hydrogen in a first reaction zone at first hydroprocessing conditions effective to form a first intermediate low-oxygen pyoil effluent;

combining the second feedstock portion with the first intermediate low-oxygen pyoil effluent to form a second heated diluted pyoil feed stream; and contacting the second heated diluted pyoil feed stream with a second deoxygenating catalyst in the presence of hydrogen in a second reaction zone at second hydroprocessing conditions effective to form additional low-oxygen pyoil effluent, and wherein the first and second deoxygenating catalysts are the same type or different types of catalyst.

2. The method of claim 1, wherein the step of combining the first feedstock portion comprises combining the first feedstock portion with the heated co-feed organic liquid stream and a hydrogen-rich gas stream to form the first heated diluted pyoil feed stream prior to the step of contacting the first heated diluted pyoil feed stream with the first deoxygenating catalyst.

3. The method of claim 2, wherein the hydrogen-rich gas stream comprises a hydrogen-rich recycle gas stream, and the method further comprises the step of:

passing the hydrogen-rich recycle gas stream through a heater to heat the hydrogen-rich recycle gas stream prior to the step of combining the first feedstock portion with the heated organic liquid stream and the hydrogen-rich gas stream.

4. The method of claim 2, wherein the heated co-feed organic liquid stream comprises a heated recycle organic liquid stream.

5. The method of claim 4, further comprises the step of:
passing a recycle organic liquid stream through a heater to form the heated recycle organic liquid stream prior to the step of combining the first feedstock portion with the heated co-feed organic liquid stream and the hydrogen-rich gas stream to form the first heated diluted pyoil feed stream.

6. The method of claim 5, wherein the hydrogen-rich gas stream comprises a hydrogen-rich recycle gas stream, and the method further comprises the step of:
combining the recycle organic liquid stream and the hydrogen-rich recycle gas stream to form a combined recycle stream, and wherein the step of passing comprises passing the combined recycle stream through the heater to form a heated combined recycle hydrogen-containing organic liquid stream, and wherein the step of combining the first feedstock portion comprises combining the first feedstock portion with the heated combined recycle hydrogen-containing organic liquid stream to form the first heated diluted pyoil feed stream.

7. The method of claim 1, wherein the step of combining the first feedstock portion comprises forming the first heated diluted pyoil feed stream having a second temperature of from about 100 to about 300° C.

8. The method of claim 1, wherein the step of contacting the first heated diluted pyoil feed stream comprises contacting the first heated diluted pyoil feed stream with the first deoxygenating catalyst at a reaction zone temperature of from about 100 to about 350° C.

9. The method of claim 1, wherein the step of combining the second feedstock portion comprises forming the second heated diluted pyoil feed stream having a third temperature of from about 120 to about 350° C.

10. The method of claim 1, wherein the step of contacting the second heated diluted pyoil feed stream comprises contacting the second heated diluted pyoil feed stream with the second deoxygenating catalyst at a reaction zone temperature of from about 160 to about 360° C.

11. A method for deoxygenating a biomass-derived pyrolysis oil, the method comprising the steps of:
separating a low-oxygen pyoil effluent and optionally selectively heating to form a low-oxygen pyoil product stream, a heated co-feed recycle organic liquid stream comprising alcohols, ethers, phenolic compounds, or mixtures thereof, and a hydrogen-rich recycle gas stream;
dividing a feedstock stream comprising the biomass-derived pyrolysis oil and having a first temperature of about 60° C. or less into portions including a first feedstock portion and a second feedstock portion;
combining the first feedstock portion with the heated co-feed recycle organic liquid stream and the hydrogen-rich recycle gas stream to form a first heated diluted pyoil feed stream;
introducing the first heated diluted pyoil feed stream to a first reaction zone that contains a first deoxygenating catalyst and that is operating at first hydroprocessing conditions effective to form a first intermediate low-oxygen pyoil effluent;
combining the second feedstock portion with the first intermediate low-oxygen pyoil effluent to form a second heated diluted pyoil feed stream; and
introducing the second heated diluted pyoil feed stream to a second reaction zone that contains a second deoxygenating catalyst and that is operating at second hydroprocessing conditions effective to form additional low-oxygen pyoil effluent, and wherein the first and second deoxygenating catalysts are the same type or different types of catalyst.

12. The method of claim 11, wherein the step of separating comprises forming the heated co-feed recycle organic liquid stream having a second temperature of from about 150 to about 400° C.

13. The method of claim 11, wherein the step of combining the first feedstock portion comprises combining the first feedstock portion with the heated co-feed recycle organic liquid stream at a predetermined pyoil to recycle oil ratio of from about 1:5 to about 1:40, wherein the predetermined pyoil to recycle oil ratio is defined by a pyoil mass flow rate of the first feedstock portion to a recycle oil mass flow rate of the heated recycle organic liquid stream.

14. The method of claim 11, wherein the step of combining the first feedstock portion comprises combining the first feedstock portion with the heated co-feed recycle organic liquid stream and a hydrogen-rich gas stream that comprises the hydrogen-rich recycle gas stream, wherein the first feedstock portion is combined with the hydrogen-rich gas stream at a predetermined pyoil to hydrogen ratio of from about 1:1 to about 1:5, and wherein the predetermined pyoil to hydrogen ratio is defined by a pyoil mass flow rate of the first feedstock portion to a hydrogen-rich gas mass flow rate of the hydrogen-rich gas stream.

15. The method of claim 11, wherein the step of dividing comprises dividing the feedstock stream into the portions including a third feedstock portion, and wherein the method further comprises:
combining the third feedstock portion with a second intermediate low-oxygen pyoil effluent to form a third heated diluted pyoil feed stream; and
introducing the third heated diluted pyoil feed stream to a third reaction zone that contains a third deoxygenating catalyst and that is operating at third hydroprocessing conditions effective to form the low-oxygen pyoil effluent.

16. The method of claim 15, wherein the step of dividing comprises dividing the feedstock stream to form the first feedstock portion having a first pyoil mass flow rate of from about 10% to about 35% of the feedstock stream, the second feedstock portion having a second pyoil mass flow rate of from about 15% to about 35% of the feedstock stream, and the third feedstock portion having a third pyoil mass flow rate of from about 15% to about 50% of the feedstock stream.

17. The method of claim 15, wherein the first deoxygenating catalyst, the second deoxygenating catalyst, or the third deoxygenating catalyst is a more active and/or increased quantity of catalyst than the other of the first deoxygenating catalyst, the second deoxygenating catalyst, or the third deoxygenating catalyst, and wherein the method further comprises:
operating the first reaction zone, the second reaction zone, or the third reaction zone that is associated with the more active and/or increased quantity of catalyst at a reaction zone temperature less than the other of the first reaction zone, the second reaction zone, or the third reaction zone.

* * * * *